US012782763B2

(12) United States Patent
Amiralizadeh Asl et al.

(10) Patent No.: US 12,782,763 B2
(45) Date of Patent: Nov. 3, 2026

(54) TERMINATION CIRCUIT COUPLED WITH A MICRO-RING MODULATOR TO REDUCE SIGNAL REFLECTION

(71) Applicant: Intel Corporation, Santa Clara, CA (US)

(72) Inventors: Siamak Amiralizadeh Asl, San Jose, CA (US); David Hui, Santa Clara, CA (US); Sanjeev Gupta, Santa Rosa, CA (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 16/991,993

(22) Filed: Aug. 12, 2020

(65) Prior Publication Data

US 2020/0371385 A1 Nov. 26, 2020

(51) Int. Cl.
*G02F 1/035* (2006.01)

(52) U.S. Cl.
CPC .................................. *G02F 1/0356* (2013.01)

(58) Field of Classification Search
CPC .... G02B 6/12; G02B 6/42; G02F 1/01; G02F 1/0356; G02F 1/09–125; G02F 1/0126–0147; G06F 13/40; H04B 5/00; H04B 10/25; H04B 10/501; H04B 10/516
USPC .......................................... 359/237, 280–289
See application file for complete search history.

(56) References Cited

U.S. PATENT DOCUMENTS 6,313,659 B1 * 11/2001 Bosnyak ............ H03K 19/0005 326/86
2019/0041591 A1 * 2/2019 Low ......................... H05K 1/14
2019/0324345 A1 * 10/2019 Vera Villarroel ..... G02F 1/2255

OTHER PUBLICATIONS

Melikyan et al., "Self-biasing of carrier depletion based silicon microring modulators," Jul. 15, 2020, Opt. Express 28, 22540-22548 (Year: 2020).*
Xiao, Xi et al. "44-GB/s Silicon Microring Modulators Based on Zigzag PN Junctions", IEEE Photonics Technology Letters, vol. 24, No. 19, 1712-1714 (2012).*
Rhim et al. "25-GB/s optical transmitter with Si ring modulator and CMOS driver." Journal of the Optical Society of Korea 18.5 (2014): 564-568. (Year: 2014).*
Jie Sun, et al., "A 128 GB/s PAM4 Silicon Microring Modulator With Integrated Thermo-Optic Resonance Tuning," Journal of Lightwave Technology, vol. 37, No. 1, Jan. 1, 2019, 6 pages.
Saeed Fathololoumi, et al., "1.6Tbps Silicon Photonics Integrated Circuit for Co-Packaged Optical-IO Switch Applications," Published in 2020 Optical Fiber Communications Conference and Exhibition (OFC), OFC Mar. 8-12, 2020, San Diego, CA, 3 pages.

(Continued)

*Primary Examiner* — Stephone B Allen
*Assistant Examiner* — Daniel J. Jordan
(74) *Attorney, Agent, or Firm* — Schwabe, Williamson & Wyatt, P.C.

(57) ABSTRACT

Embodiments of the present disclosure are directed to a photonic integrated circuit (PIC) that includes a micro-ring modulator (MRM) that is coupled with termination circuitry to reduce the reflection coefficient of the MRM when the PIC is electrically coupled to a driver. In embodiments, the termination circuitry may include one or more passive elements. Other embodiments may be described and/or claimed.

17 Claims, 5 Drawing Sheets

(56) References Cited

OTHER PUBLICATIONS

Hai Li, et al., "A 25 GB/s, 4.4 V-Swing, AC-Coupled Ring Modulator-Based WDM Transmitter with Wavelength Stabilization in 65 nm CMOS," IEEE Journal of Solid-State Circuits, vol. 50, No. 12, Dec. 2015, 15 pages.
Samira Karimelahi, et al., "Ring modulator small-signal response analysis based on pole-zero representation," 2016 Optical Society of America, OCIS codes: (130.4110) Modulators; (230.5750) Resonators; (250.0250) Optoelectronics, vol. 24, Issue 7, pp. 7585-7759, (2016), https://doi.org/10.1364/OE.24.007585, 15 pages.

* cited by examiner

TERMINATION CIRCUIT COUPLED WITH A MICRO-RING MODULATOR TO REDUCE SIGNAL REFLECTION

TECHNICAL FIELD

Embodiments of the present disclosure generally relate to the field of photonic integrated circuits (PIC), in particular to micro-ring modulators (MRM) within a PIC.

BACKGROUND

Computing platforms are increasingly using photonic systems that use silicon as an optical medium. These photonic systems, which may be implemented as a PIC, may be used as optical interconnects to provide faster data transfer both between and within microchips.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
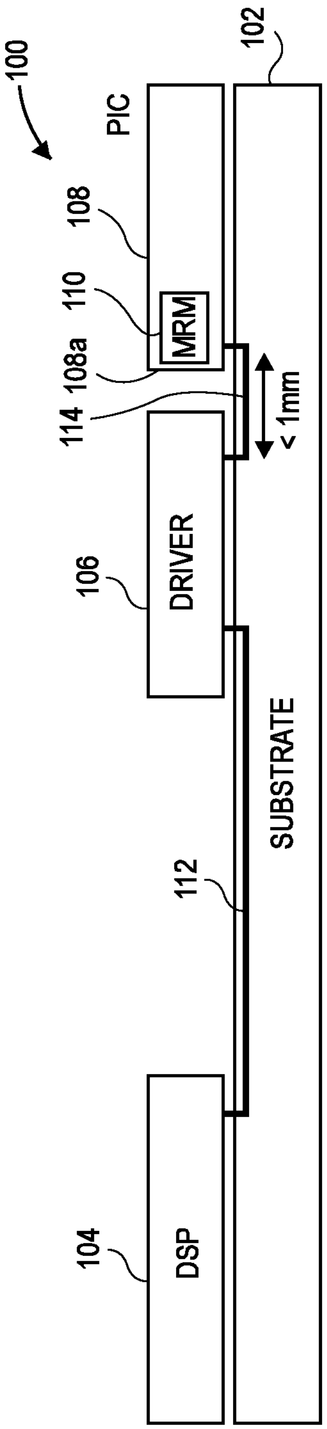
FIG. 1A (Prior Art)
FIG. 1A and FIG. 1B (collectively referred to herein as "FIG. 1") illustrate two simplified transmitter block diagrams with a PIC using a micro-ring modulator (MRM), in accordance with various embodiments.

Silicon photonics has proven to be one of the leading technologies for manufacturing optical transmitter modules. Millions of units have been deployed throughout datacenters during the last few years. As industry transitions to 100 Gb/s per lane data rates and beyond, optical modulators capable of accommodating these high data rates in a power-efficient manner will become increasingly important. Legacy Mach-Zehnder modulators (MZMs) have been a popular choice due to their mature technology and tolerance to temperature and wavelength drift. However, with the increasing connectivity bandwidth trends, it has been increasingly challenging to meet the power consumption and footprint requirements using MZMs.

MRMs have shown great potential due to their higher efficiency, compact size, and lower power consumption. MRM are an enabling component for photonic engine modules designed for co-packaging, for example, with an Ethernet switch application specific integrated circuit (ASIC), as well as co-packaged optics with central processing units (CPUs). A challenge with using MRMs is there magnitude of reflection coefficient is very close to 1 due to his capacitive nature. Thus, a significant portion of an RF electrical signal driving the MRM are reflected back toward the driver during electro-optical (E/O) conversion. This imposes limitation in terms of the electrical channel length between the source and the MRM, and the driver impedance.

One legacy approach to mitigating the impact of reflections from an MRM is to keep the round-trip time of the reflected signal between the driver output and the ring modulator input RF pads much lower than the time duration of individual transmitted data symbols. This is achieved by having a short electrical channel between the driver and the MRM, for example, in the order of few hundred microns for 56 Gbaud signals. However, the short channel requirement leads to reduced flexibility in the driver and as well as in the PIC design as shown below with respect to FIG. 1. For example, the MRM must be placed at the edge of the PIC, which limits design flexibility. The biasing circuit needs to be included in the driver to provide DC-coupled signals driving the MRM, which in turn leads to challenges from packaging and high-speed performance point of view. As an example, the driver needs to include a series capacitance and a biasing resistor at the output stage to provide DC bias to the signal going into the MRM. The capacitance and/or the resistance values need to be large enough to achieve a reasonable low-frequency cutoff. However, it is not possible to achieve capacitance in the order of 1 nF or higher integrated in the driver with legacy process technology. On the other hand, a large resistance can lead to significant voltage drop due to the generated photocurrent from the MRM.

Another legacy approach to mitigating the impact of reflections relies on the Finite Impulse Response (FIR) taps in the transmitter digital signal processor (DSP) to compensate for the reflection between the driver and the MRM. The number of required post-cursors for pre-compensation will depend on the length of the electrical channel. Commercially available DSPs have limited equalization capability on the transmit side which is usually not sufficient to compensate for reflections extending more than few unit-intervals (UIs) in time. Even with a custom DSP design with the reflection compensation capability at the transmitter, there will be a performance penalty due to limited resolution of the taps. In addition, using transmit DSP taps to mitigate reflections leads to a reduced effective voltage swing and less inter-symbol interference (ISI) compensation capability.

Embodiments described herein are directed to coupling a MRM with termination circuitry to reduce the reflection coefficient of the MRM when used within a PIC coupled with a driver. In embodiments, the termination circuitry may use one or more passive elements. In embodiments, the termination impedance may be selected for a given system considering the driver, the channel, and the ring modulator characteristics. In implementation, embodiments minimize electrical reflections between the driver and the ring modulator and improve the subsystem bandwidth, allow more flexible design of the driver and the PIC, relax packaging requirements, and allow integrated driver and DSP implementations to be used where cost and power consumption are lower compared to a discrete driver solution. In particular, this may be important for co-packaging.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1B:
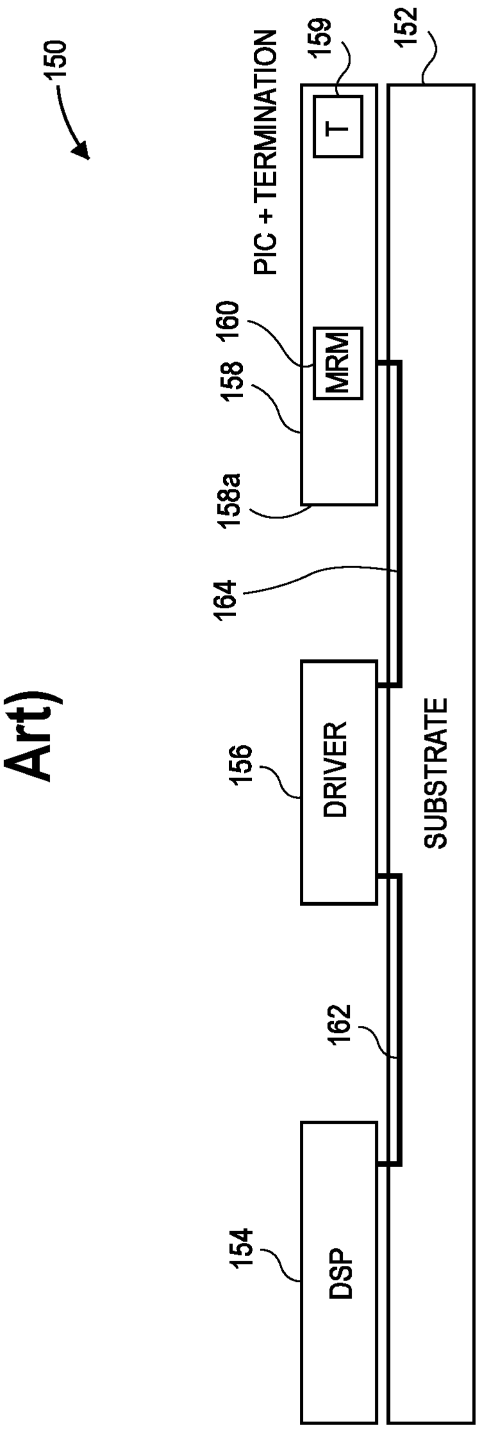

FIG. 1 illustrates two simplified transmitter block diagrams with a PIC using a MRM, in accordance with various embodiments. Legacy implementation 100 shows a DSP 104, a driver 106, and a PIC 108 coupled to a substrate 102. The PIC 108 includes a MRM 110. In legacy implementations, the MRM 110 is positioned close to the driver 106. A first channel 112 electrically connects the DSP 104 to the driver 106. A second channel 114 electrically connects the driver 106 with the PIC 108 and the MRM 110, with the second channel 114 distance of less than 1 mm.

MRM 110, 160 can be considered a lumped device, where resistance, inductance, and capacitance may be assumed to be concentrated in one place, because its size is much smaller than the operating wavelength of the high-speed radio-frequency (RF) signals along the various channels 112, 114, as well as other channels for datacenter interconnect (not shown). For example, the size of the MRM 110, 160 may be less than 100 μm. As a result, electro-optic co-design of systems using MRMs require different considerations compared to systems using conventional travelling-wave electrode (TWE) MZMs that have a few-millimeter length.

The magnitude of reflection coefficient (or S11) is very close to 1 for MRMs 110, 160 due to its capacitive nature. Consequently, significant portion of the RF electrical signals driving MRMs are reflected back towards the source during E/O conversion. This imposes limitations in terms of the electrical channel length from the driver (or source) to the MRM and the driver (or source) impedance.

In legacy implementations, the driver signal source needs to include termination in the output stage to attenuate the electrical signal reflected from the MRM. In addition, the electrical channel length between the driver/source and the MRM needs to be as short as possible (typically in the order of few hundred microns) to prevent significant performance degradation from the reflections. Long electrical channel leads to extension of the reflections in time domain beyond the compensation capability of finite impulse response (FIR) taps available in commercial DSPs for cost-sensitive datacenter applications with direct detection.

Returning now to legacy implementation 100, due to the short channel 114 requirement, the driver 106 and the PIC 108 need to be very close to each other, for example not exceeding 1 mm, which poses challenges for driver 106 and PIC 108 implementations. Furthermore, the MRM 110 modulator must be placed at or near an edge 108*a* of the PIC 108, limiting the design flexibility of the PIC 108. In addition, the driver 106 also needs to provide DC-coupled signals to the MRM 110 for bias. Furthermore, there are challenges from packaging and high-speed performance point of view as the biasing circuit, discussed further with respect to FIG. 2, would preferably be included in the driver 106.

Transmitter 150 illustrates an embodiment that allows independent design of the driver 156 and the PIC 158 without introducing significant complexity by introducing a termination circuit 159 coupled with the MRM 160 within the PIC 158. In other embodiments, the termination circuit 159 may be located outside the PIC 158. Transmitter 150 also includes a substrate 152 to which the DSP 154, driver 156, and PIC 158 are coupled. Additionally, a first channel 162 electrically couples the DSP 154 with the driver 156, and a second channel 164 electrically couples the driver 156 with the PIC 158. The first channel 162 and the second channel 164 may be trace routings located on a surface of the substrate 152, or routings located within layers of the substrate 152. The second channel 164 may be greater than 1 mm as shown with respect to legacy second channel 114 of legacy implementation 100.

Figure 2:
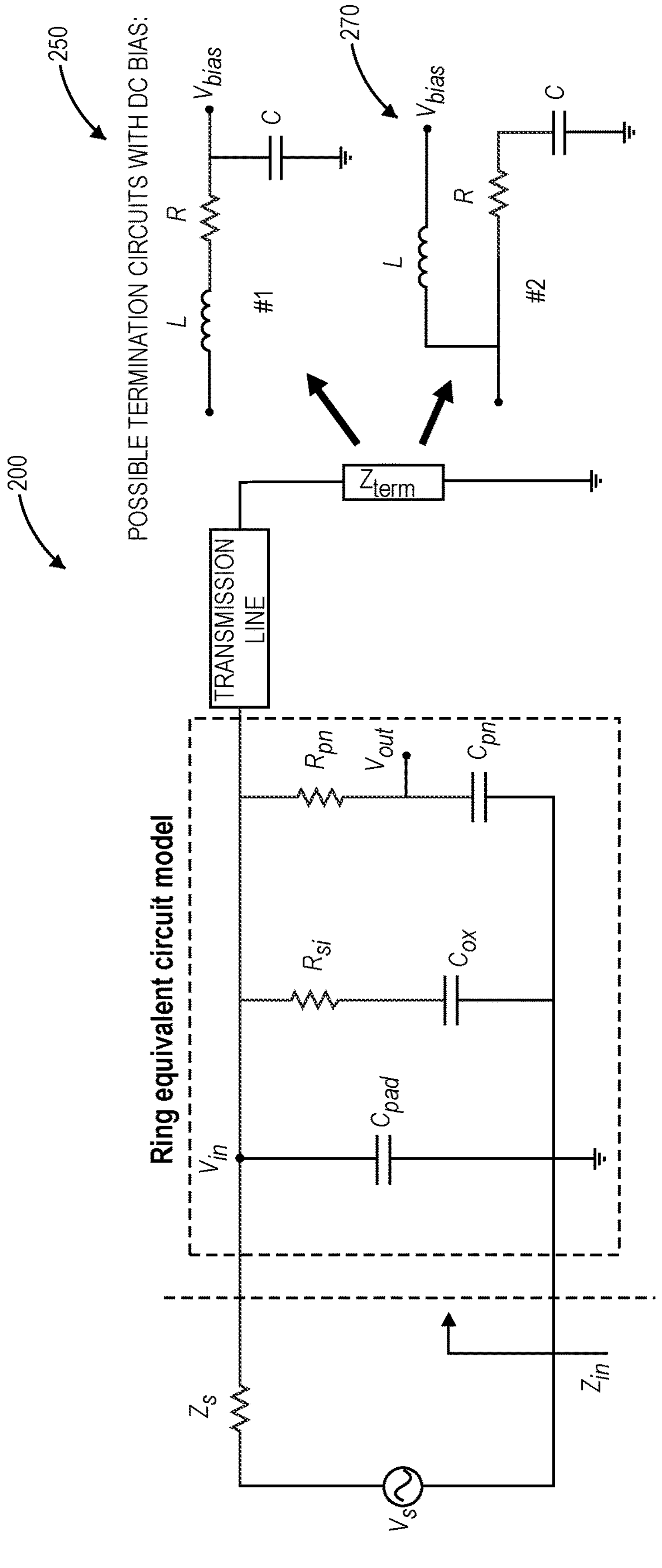
FIG. 2 illustrates an example circuit model that includes source, MRM and various termination circuits, in accordance with various embodiments.

With this embodiment, reflections from the MRM 160 are significantly reduced by the presence of the termination circuit 159. In addition, there is more design flexibility by the greater second channel 164 distance between the driver 156 and the PIC 158. Furthermore, there is more flexibility in locating the MRM 160 within the PIC 158, for example not having to position the MRM 160 close to a surface 158*a* nearest the driver 156. Additionally, this embodiment also simplifies biasing for the MRM 160. The MRM bias may be provided by the termination 159, as shown in FIG. 2 where termination circuits 250 and 270 are given as two examples. An alternative implementation may be biasing the MRM 160 from the source side, where the DSP 154, driver 156 and bias-tees (not shown) are integrated together.

The termination circuit 159 may include passive elements to optimize the reflection coefficient and overall transmitter transfer function, and are discussed further with respect to FIG. 2. In embodiments, the termination circuit may be located within the PIC 158, or as a discrete component (not shown) located close to the PIC 158 and coupled with the MRM 160 RF pads (not shown) via an electrical channel. While the driver 156 is shown as a discrete component, in embodiments the driver 156 may be integrated into the DSP 154, reducing the complexity and the power consumption of the transmitter 150.

FIG. 2 illustrates an example circuit model that includes source, MRM, and various termination circuits, in accordance with various embodiments. MRM circuit 200 shows a simplified signal source of $V_s$ with $Z_s$ impedance. $R_{si}$ is the silicon substrate resistance, $C_{ox}$ is the oxide layer capacitance, and $C_{pad}$ is the capacitance between the ground and signal pads through the dielectric. $R_{pn}$ represents the ring pn-junction resistance, and $C_{pn}$ represents the pn-junction capacitance. In various embodiments, the values of the circuit elements may be extracted by fitting the real and imaginary parts of the input reflection coefficient, $S_{11}$, to the measurements taken by, for example, an unterminated probe. The termination impedance, $Z_{term}$, is connected to the RF pads. While $Z_{term}$ can be implemented by any combination of passive elements based on required system characteristics, a first example termination circuit 250, and a second example termination circuit 270 are shown.

In embodiments, the various components chosen may be selected to optimize the overall input impedance, $Z_{in}$.

The input impedance of the ring modulator, $Z_{in}$, can be calculated as:

$$Z_{in} = \frac{1}{jwC_{pad} + \frac{1}{\left(R_{si} + \frac{1}{jwC_{ox}}\right)} + \frac{1}{\left(R_{pn} + \frac{1}{jwC_{pn}}\right)} + \frac{1}{Z_{term}}}, \quad (1)$$

where w is the angular frequency and $j=\sqrt{-1}$. For a given source impedance, $Z_s$, the input reflection coefficient, $S_{11}$ or $\Gamma$, is given by $$S_{11} = \frac{z_{in} - z_s}{z_{in} + z_s}. \quad (2)$$

The overall response of the transmitter can be estimated by dividing the output signal, $V_{out}(w)$, by the source signal, $V_s(w)$, as $$\frac{V_{out}(w)}{V_s(w)} = H_{tx}(w) = \frac{z_{in}}{z_{in} + z_s} \cdot \frac{1}{1 + jwR_{pn}C_{pn}}. \quad (3)$$

Figure 3:
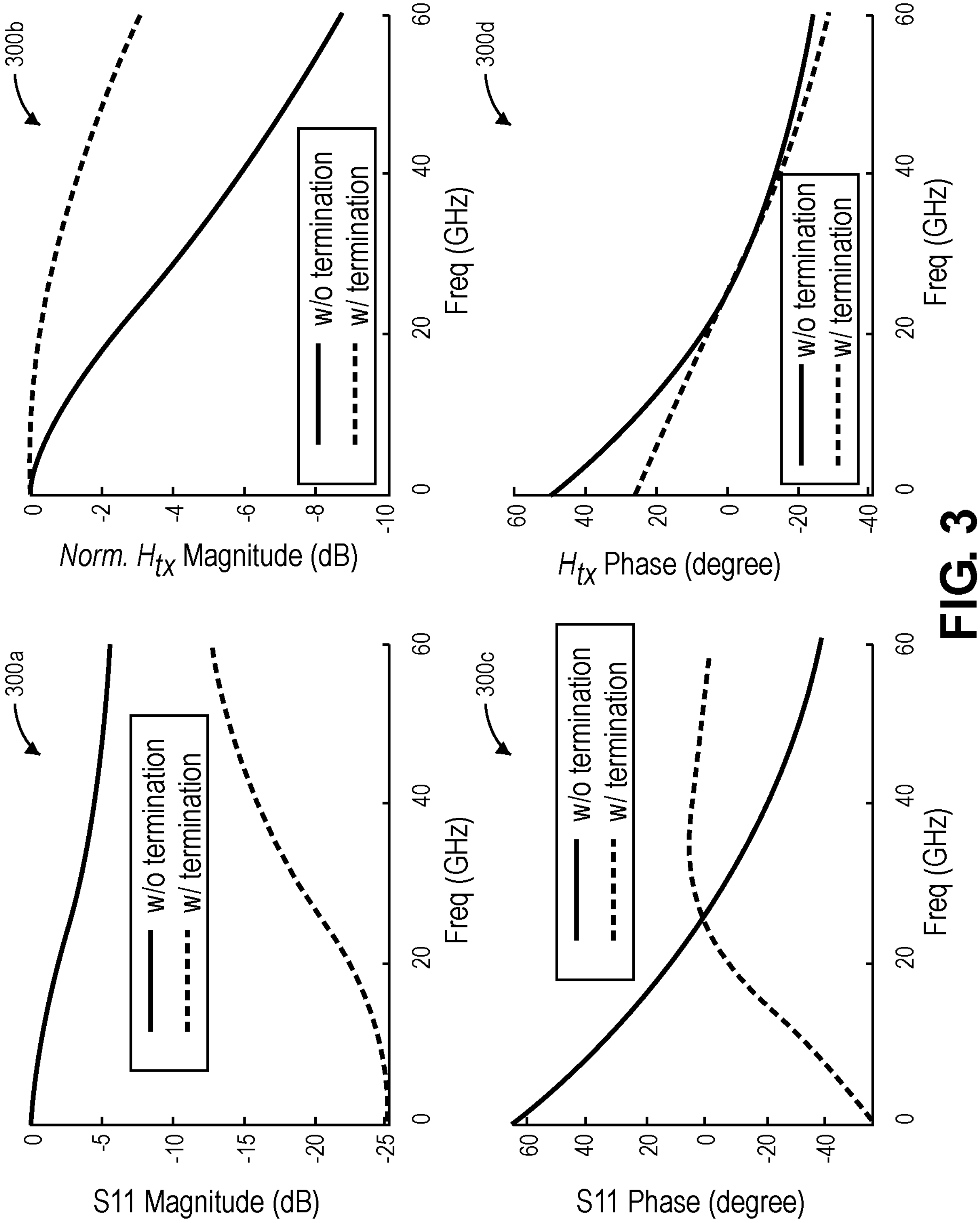
FIG. 3 illustrates example input reflection coefficient and transmitter frequency responses with and without termination, in accordance with various embodiments.

FIG. 3 illustrates example input reflection coefficient and transmitter frequency responses with and without termination, in accordance with various embodiments. Diagrams 300*a*-300*d* use the MRM circuit model as shown in FIG. 2 and equations (1)-(3) with and without termination for a 50 ohm source impedance.

The termination $Z_{term}$ is a 45 ohm resistor in series with a 150 pH inductor, based on the first example termination circuit 250 of FIG. 2, where the capacitance is large enough and can be neglected in the high frequency regime beyond 100 MHz. Diagram 300*a* shows that the magnitude of the $S_{11}$ is higher than −4 dB up to 30 GHz without the termination circuit, which would require the introduction of limitations to the driver architecture and the RF channel length as discussed above. With the termination circuit, the input reflection is improved significantly leading to a better than −18 dB $S_{11}$ magnitude up to 30 GHz.

Diagram 300*b* shows the normalized transmitter frequency response, $H_{tx}(w)$. The 3-dB bandwidth of the transmitter improves from 24 GHz to 60 GHz with the termination circuitry due to reduced capacitive impact from the MRM. The termination circuitry also leads to a similar or slightly better phase response as shown in diagram 300*c* and diagram 300*d*.

Note that with the termination circuit, the MRM sees a lower signal swing due to the change in capacitive impedance, as compared to the case without any termination circuit. Nonetheless, using termination circuitry provides increased reliability and performance in power-efficient signal sources with voltage swings as high as 3Vppd to 100 ohm load that are commercially available using drivers integrated with the DSP in 7-nm complementary metal-oxide-semiconductor (CMOS). This is sufficient to meet the IEEE standard specifications with a MRM.

Figure 4:
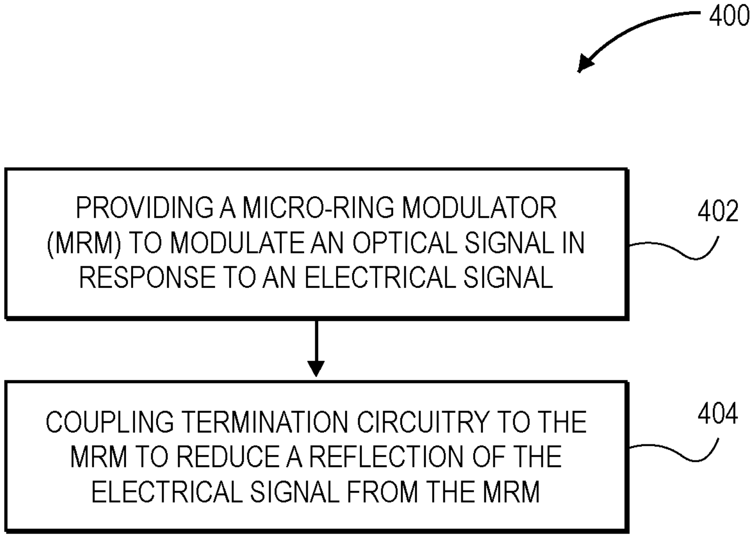
FIG. 4 shows an example process for implementing a termination circuit coupled with a MRM to reduce signal reflection, in accordance with various embodiments.

FIG. 4 shows an example process for implementing a termination circuit coupled with a MRM to reduce signal reflection, in accordance with various embodiments. Process 400 may be implemented using the components and techniques as described herein, and in particular with respect to FIGS. 1-3.

At block 402, the process may include providing a MRM to modulate an optical signal in response to an electrical signal. In embodiments, the MRM may be similar to MRM 160 of FIG. 1, and portions of MRM circuit 200. In embodiments, the MRM may be placed at various locations within a PIC 158.

At block 404, the process may include coupling termination circuitry to the MRM to reduce a reflection of the electrical signal from the MRM. The termination circuit may be similar to termination circuit 159 of FIG. 1, and embodiments of the termination circuit are shown with respect to the first example termination circuit 250 and second example termination circuit 270 of FIG. 2. In some embodiments, the termination circuit 159 and the MRM 160 may be located within a PIC 158 as shown with respect to FIG. 1. In other embodiments, the termination circuit may be located outside the PIC yet electrically coupled with the MRM.

Figure 5:
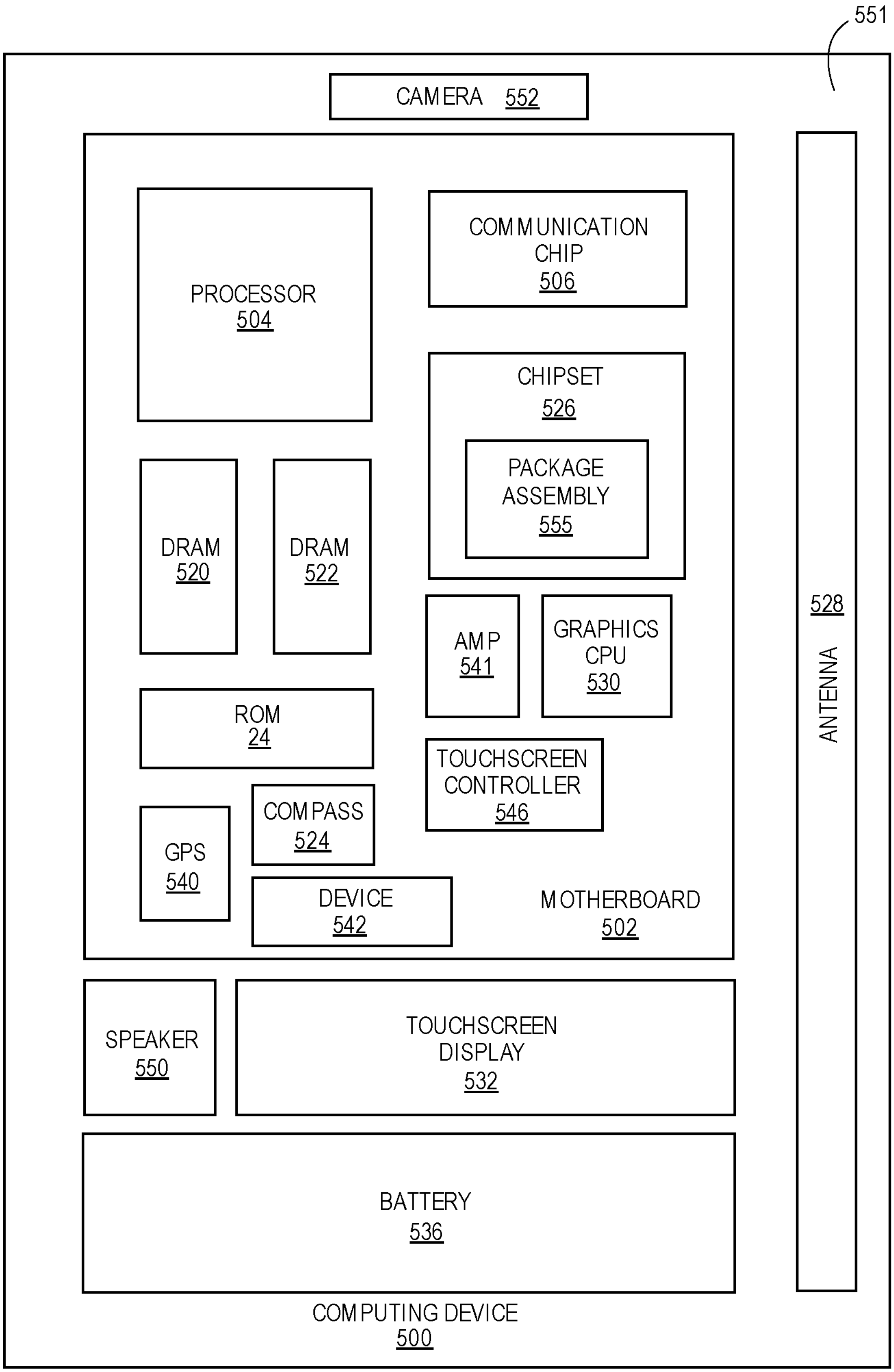
FIG. 5 schematically illustrates a computing device 500 in accordance with one embodiment.

FIG. 5 Embodiments of the present disclosure may be implemented into a system using any suitable hardware and/or software to configure as desired. FIG. 5 schematically illustrates a computing device 500 in accordance with one embodiment. The computing device 500 may house a board such as motherboard 502 (i.e. housing 551). The motherboard 502 may include a number of components, including but not limited to a processor 504 and at least one communication chip 506. The processor 504 may be physically and electrically coupled to the motherboard 502. In some implementations, the at least one communication chip 506 may also be physically and electrically coupled to the motherboard 502. In some embodiments, communication chip 506 is incorporated with the teachings of the present disclosure. That is, it includes a PIC having a MRM with a termination circuit to reduce reflection of an electrical signal by the MRM. In further implementations, the communication chip 506 may be part of the processor 504. In other embodiments, one or more of the other enumerated elements may be incorporated with the teachings of the presented disclosure.

Depending on its applications, computing device 500 may include other components that may or may not be physically and electrically coupled to the motherboard 502. These other components may include, but are not limited to, volatile memory (e.g., DRAM) 520, non-volatile memory (e.g., ROM) 524, flash memory 522, a graphics processor 530, a digital signal processor (not shown), a crypto processor (not shown), a chipset 526, an antenna 528, a display (not shown), a touchscreen display 532, a touchscreen controller 546, a battery 536, an audio codec (not shown), a video codec (not shown), a power amplifier 541, a global positioning system (GPS) device 540, a compass 542, an accelerometer (not shown), a gyroscope (not shown), a speaker 550, a camera 552, and a mass storage device (such as hard disk drive, compact disk (CD), digital versatile disk (DVD), and so forth) (not shown). Further components, not shown in FIG. 5, may include a microphone, a filter, an oscillator, a pressure sensor, or an RFID chip. In embodiments, one or more of the package assembly components 555 may include a termination circuit coupled with a MRM as part of the PIC, as discussed herein.

The communication chip 506 may enable wireless communications for the transfer of data to and from the computing device 500. The term "wireless" and its derivatives may be used to describe circuits, devices, systems, processes, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. The communication chip 506 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 506 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 506 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 506 may operate in accordance with other wireless protocols in other embodiments. In embodiments, the communication chip 506 may include a PIC that incorporates all are part of a termination circuit coupled with a MRM, as discussed herein.

The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

The processor 504 of the computing device 500 may include a die in a package assembly such as, for example, a termination circuit coupled with a MRM as part of a PIC, as described herein. The term "processor" may refer to any device or portion of a device that processes electronic data from registers and/or memory to transform that electronic data into other electronic data that may be stored in registers and/or memory.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data, for example an all-in-one device such as an all-in-one fax or printing device.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Some non-limiting examples are provided below.

EXAMPLES

Example 1 is an optical apparatus, comprising: a micro-ring modulator (MRM) to receive an electrical signal, and modulate an optical signal, in response to the received electrical signal; and a termination circuit electrically coupled with the MRM to reduce an amount of reflection of the received electrical signal from the MRM.

Example 2 may include the optical apparatus of example 1, wherein the MRM is to receive the electrical signal from a driver adjacently disposed to the MRM.

Example 3 may include the optical apparatus of example 2, wherein an electrically conductive distance between the driver and the MRM is greater than 1 mm.

Example 4 may include the optical apparatus of example 1, wherein the termination circuit includes one or more passive elements.

Example 5 may include the optical apparatus of example 4, wherein the one or more passive elements includes at least one resistor element.

Example 6 may include the optical apparatus of example 1, wherein the MRM and the termination circuit are integrated in a photonic integrated circuit (PIC).

Example 7 may include the optical apparatus of example 1, wherein the MRM is part of a photonic integrated circuit (PIC), and the termination circuit is a discrete component externally proximate to the PIC.

Example 8 may include the optical apparatus of any one of examples 1-7, wherein the termination circuit contributes to provision of a desired reflection coefficient of the MRM.

Example 9 may be a method for transmitting optical signals, the method comprising: providing a micro-ring modulator (MRM) to modulate an optical signal in response to an electrical signal; and coupling termination circuitry to the MRM to reduce a reflection of the electrical signal from the MRM.

Example 10 may include the method of example 9, further including providing driver circuitry to provide the electrical signal to the MRM.

Example 11 may include the method of example 10, wherein providing the driver circuitry comprises providing the driver circuitry to be at least 1 mm away from the MRM in terms of electrical conductive distance.

Example 12 may include the method of any one of examples 9-11, wherein coupling the termination circuit comprises coupling a resistor element or a capacitor element.

Example 13 may include the method of any one of examples 9-11, wherein the providing of a MRM and the coupling of termination circuitry are process operations of forming a photonic integrated circuit (PIC).

Example 14 may be a photonic system, comprising: a driver to generate and provide an electrical signal; a laser to provide an optical beam; a micro-ring modulator (MRM) to modulate the optical beam to output an optical signal in response to the electrical signal received from the driver; a termination circuit coupled with the MRM; and wherein the termination circuit is to reduce an amount of reflection of the electrical signal from the MRM.

Example 15 may include the photonic system of example 14, wherein the driver is located at an electrically conductive distance greater than 1 mm from the MRM.

Example 16 may include the photonic system of example 14, wherein the termination circuit provides an impedance to the MRM.

Example 17 may include the photonic system of example 14, wherein the laser and the MRM are part of a photonic integrated circuit (PIC).

Example a team may include the photonic system of example 17, wherein the termination circuit is also part of the PIC.

Example 19 may include the photonic system of example 14, wherein the termination circuit contributes to provision of a desired reflection coefficient of the MRM.

Example 20 may include the photonic system of any one of examples 14-19, wherein the termination circuit includes one or more passive elements.

We claim:

1. An optical apparatus, comprising:

a micro-ring modulator (MRM) to receive an electrical signal, and modulate an optical signal, in response to the received electrical signal from a driver adjacently disposed to the MRM on a face of a substrate, wherein an electrically conductive distance between the driver and the MRM, as measured in a direction parallel to the face of the substrate, is greater than 1 millimeter (mm); and a termination circuit electrically coupled with the MRM and coupled to RF pads of the MRM, wherein the termination circuit has a termination impedance value that is calculated using a resistance or capacitance value of an element of the MRM, and wherein the termination impedance value is selected to change an input impedance of the MRM to reduce an amount of reflection of the received electrical signal from the MRM.

2. The optical apparatus of claim 1, wherein the termination circuit includes one or more passive elements.

3. The optical apparatus of claim 2, wherein the one or more passive elements includes at least one resistor element.

4. The optical apparatus of claim 1, wherein the MRM and the termination circuit are integrated in a photonic integrated circuit (PIC).

5. The optical apparatus of claim 1, wherein the MRM is part of a photonic integrated circuit (PIC), and the termination circuit is a discrete component externally proximate to the PIC.

6. The optical apparatus of claim 1, wherein the element of the MRM is a substrate of the MRM, an oxide layer of the MRM, or a pn-junction of the MRM.

7. A photonic system, comprising:

a driver adjacently disposed to a micro-ring modulator (MRM) on a face of a substrate to generate an electrical signal;

the MRM to modulate an optical beam to output an optical signal in response to the electrical signal received from the driver, wherein an electrically conductive distance between the driver and the MRM, as measured in a direction parallel to the face of the substrate, is greater than 1 millimeter (mm); and a termination circuit electrically coupled with the MRM and coupled to RF pads of the MRM, wherein the termination circuit has a termination impedance value that is calculated using a resistance or capacitance value of an element of the MRM, and wherein the termination impedance value is selected to change an input impedance of the MRM to reduce an amount of reflection of the received electrical signal from the MRM.

8. The photonic system of claim 7, wherein the MRM is part of a photonic integrated circuit (PIC).

9. The photonic system of claim 8, wherein the termination circuit is also part of the PIC.

10. The photonic system of claim 7, wherein the termination impedance value is based on a resistance of a substrate of the MRM or a resistance of a pn-junction of the MRM.

11. The photonic system of claim 7, wherein the termination impedance value is based on a capacitance of an oxide layer of the MRM or a capacitance of a pn-junction of the MRM.

12. A transmitter, comprising:

a substrate;

a driver circuit adjacently disposed to a MRM on a face of the substrate configured to provide an electronic signal, wherein an electrically conductive distance between the driver and the MRM, as measured in a direction parallel to the face of the substrate, is greater than 1 millimeter (mm);

a photonic integrated circuit (PIC) coupled with the substrate, wherein the PIC includes the MRM that is configured to modulate, based on the electronic signal, an optical signal; and a termination circuit that is communicatively coupled with the MRM and coupled to RF pads of the MRM, wherein the termination circuit has a termination impedance value that calculated using on a resistance or capacitance of an element of the MRM.

13. The transmitter of claim 12, wherein a change in the termination impedance of the termination circuit changes an input impedance of the MRM.

14. The transmitter of claim 13, wherein the termination impedance is further based on a desired input impedance of the MRM.

15. The transmitter of claim 12, wherein the termination circuit is an element of the PIC.

16. The transmitter of claim 12, wherein the termination impedance value is based on a resistance of a substrate of the MRM or a resistance of a pn-junction of the MRM.

17. The transmitter of claim 12, wherein the termination impedance value is based on a capacitance of an oxide layer of the MRM or a capacitance of a pn-junction of the MRM.

* * * * *